(12) United States Patent
Zhang et al.

(10) Patent No.: US 10,702,093 B2
(45) Date of Patent: Jul. 7, 2020

(54) BREWING APPARATUS

(71) Applicant: Tsann Kuen (Zhangzhou) Enterprise Co., Ltd., Zhangzhou, Fujian (CN)

(72) Inventors: Yanxiang Zhang, Fujian (CN); Mengxin Han, Fujian (CN)

(73) Assignee: TSANN KUEN (ZHANGZHOU) ENTERPRISE CO., LTD., Zhangzhou, Fujian (CN)

(*) Notice: Subject to any disclaimer, the term of this patent is extended or adjusted under 35 U.S.C. 154(b) by 476 days.

(21) Appl. No.: 15/410,397

(22) Filed: Jan. 19, 2017

(65) Prior Publication Data

US 2017/0208987 A1    Jul. 27, 2017

(30) Foreign Application Priority Data

Jan. 26, 2016 (CN) .......................... 2016 1 0051199

(51) Int. Cl.
*A47J 31/36* (2006.01)
*A47J 31/40* (2006.01)

(52) U.S. Cl.
CPC ....... *A47J 31/3633* (2013.01); *A47J 31/3638* (2013.01); *A47J 31/407* (2013.01)

(58) Field of Classification Search
CPC ... B65D 85/8043; A47J 31/407; A47J 31/462; A47J 31/3638; A47J 31/00
USPC .......................................................... 99/280
See application file for complete search history.

(56) References Cited

U.S. PATENT DOCUMENTS

| 2014/0023765 A1 | 1/2014 | Ozanne et al. |
| 2016/0198890 A1* | 7/2016 | Ozanne ............... A47J 31/3633 99/295 |

FOREIGN PATENT DOCUMENTS

| WO | WO2012020343 A1 | 2/2012 |
| WO | WO2015032651 A1 | 3/2015 |

* cited by examiner

*Primary Examiner* — Michael G Hoang
*Assistant Examiner* — Bonita Khlok
(74) *Attorney, Agent, or Firm* — Muncy, Geissler, Olds & Lowe, P.C.

(57) ABSTRACT

A brewing apparatus is adapted for brewing articles contained in a capsule, and includes a capsule seat, a control device, and at least one drive mechanism. The capsule seat is adapted to receive the capsule therein. The control device has a slide slot. The at least one drive mechanism engages slidably the slide slot and is connected to the capsule seat. The control device is pivotable to drive slide movement of the at least one drive mechanism, thereby moving the capsule seat and converting the brewing apparatus between a brewing state and a standby state.

7 Claims, 5 Drawing Sheets

BREWING APPARATUS

CROSS-REFERENCE TO RELATED APPLICATION

This application claims priority of Chinese Patent Application No. 201610051199.X, filed on Jan. 26, 2016.

FIELD

The disclosure relates to a brewing apparatus, and more particularly to a brewing apparatus for brewing articles contained in a capsule.

BACKGROUND

A conventional brewing machine for brewing articles contained in a capsule typically includes a brewing apparatus that has a capsule-receiving seat for receiving the capsule therein, and a drive mechanism operable to drive movement of the capsule-receiving seat. The articles may be, for example, ground coffee or tea leaves. A continuing effort has been dedicated to improve the design of the brewing apparatus.

SUMMARY

Therefore, an object of the disclosure is to provide a brewing apparatus that has a simple structure with relatively few component parts.

According to the disclosure, the brewing apparatus is adapted for brewing articles contained in a capsule. The brewing apparatus includes a capsule seat, a control device, and at least one drive mechanism. The capsule seat is adapted to receive the capsule therein. The control device has a slide slot. The at least one drive mechanism engages slidably the slide slot and is connected to the capsule seat. The control device is pivotable to drive slide movement of the at least one drive mechanism, thereby moving the capsule seat and converting the brewing apparatus between a brewing state and a standby state.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
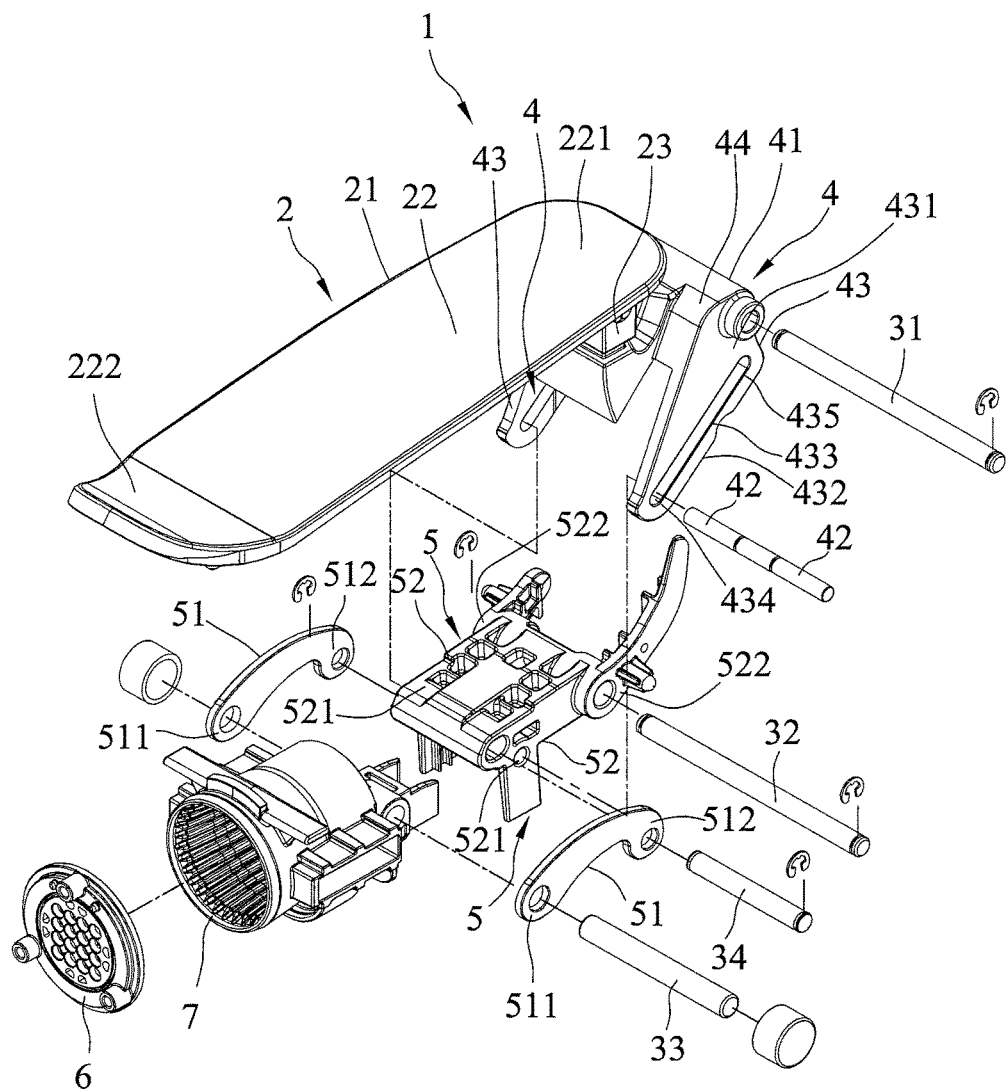
FIG. 1 is a partly exploded perspective view illustrating an embodiment of a brewing apparatus according to the disclosure.
Figure 2:
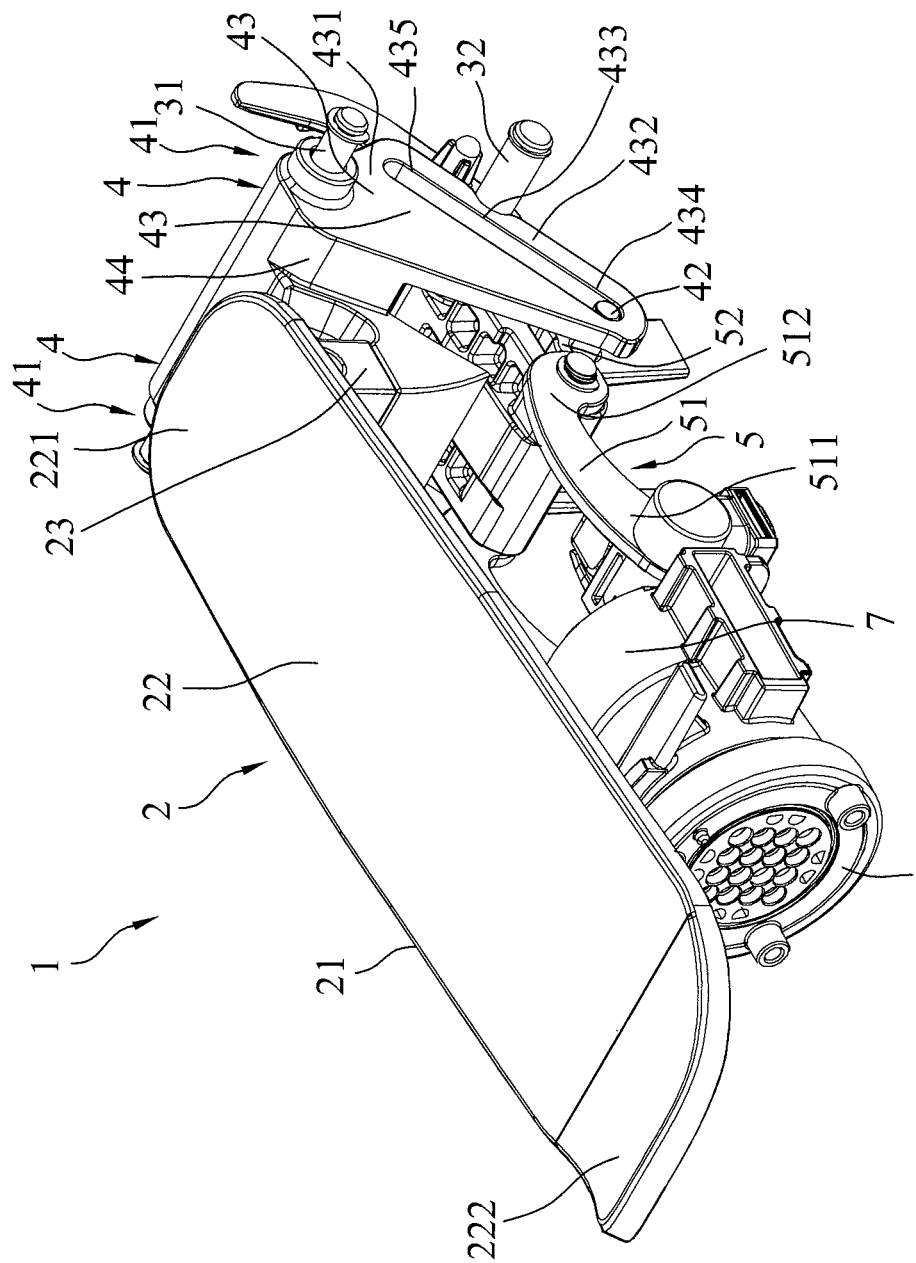
FIG. 2 is an assembled perspective view of the embodiment.
Figure 3:
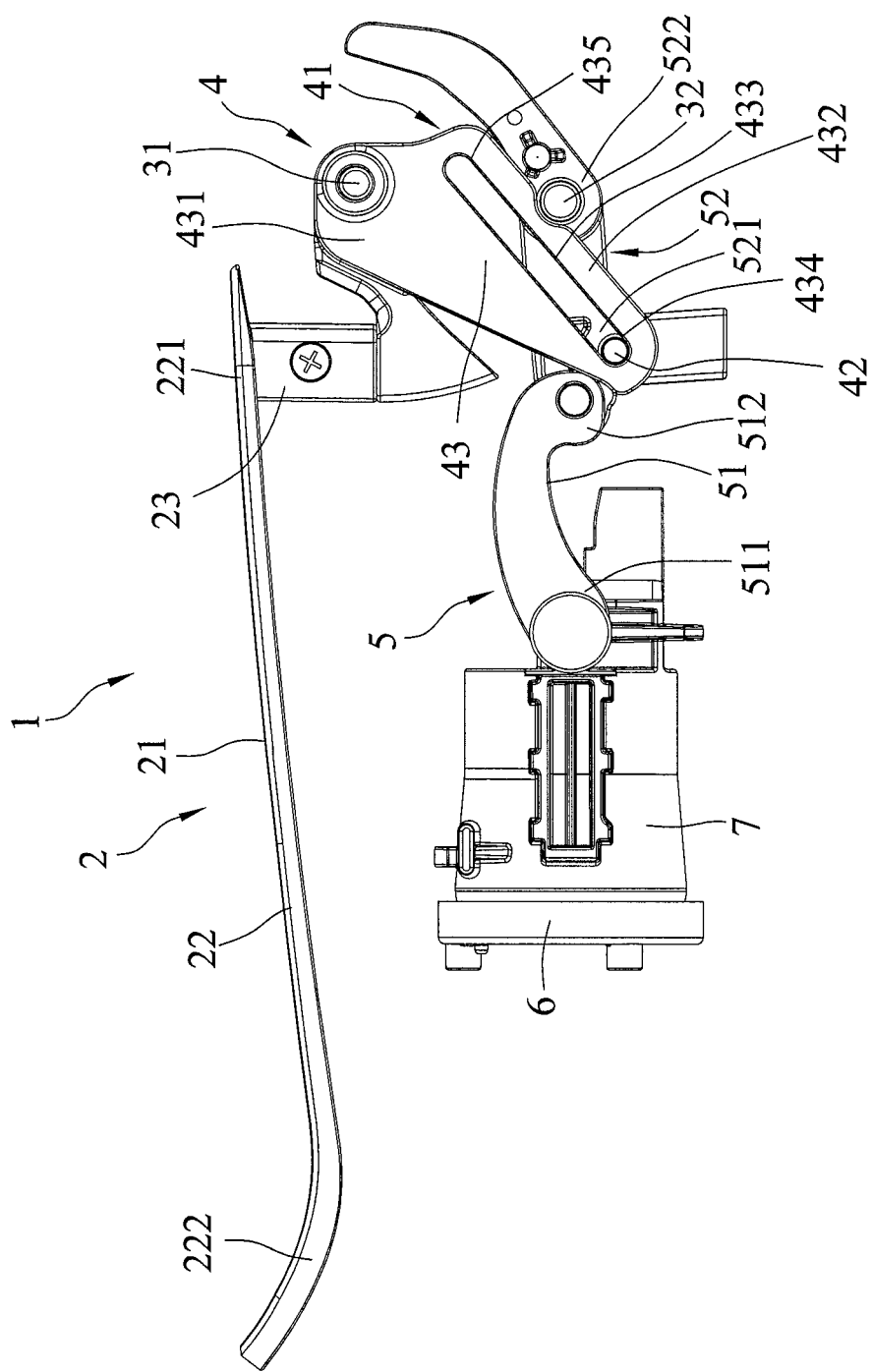
FIG. 3 is a side view illustrating the embodiment in a brewing state.

Referring to FIGS. 1 to 3, an embodiment of a brewing apparatus according to the disclosure is adapted to be mounted to a case (not shown) of a brewing machine, and is adapted for brewing articles contained in a capsule. In this embodiment, the brewing apparatus includes a control device 1 that has a movable operating mechanism 2, two pivot units 4 connected to and co-movable with the operating mechanism 2, and a stationary pivot shaft 31 and a stationary joint shaft 32 securely disposed on the case. The brewing apparatus further includes a stationary seat 6 fixedly secure to the case, a capsule seat 7 movable relative to said stationary seat 6, and two drive mechanisms 5 connected to the capsule seat 7 and co-movable respectively with the pivot units 4.

The operating mechanism 2 includes a substantially inverted L-shaped handle 21 that has a main segment 22 and a pivot segment 23. The main segment 22 has a base portion 221 and an operating portion 222 that extends from a front end of the base portion 221 and that is bent away from the capsule seat 7 so as to provide ease and convenience in operating the handle 21. The pivot segment 23 extends downwardly from the base portion 221 of the main segment 22.

Each of the pivot shaft 31 and the joint shaft 32 extends in a left-right direction, and has two opposite ends fixedly connected to the case (not shown). The joint shaft 32 is located under the pivot shaft 31.

Each of the pivot units 4 includes a pivot member 41 and a slide pin 42. The pivot member 41 is connected to and co-movable with the operating mechanism 2, and has a wing segment 43 pivotable about the pivot shaft 31, and a linking segment 44 extending from the wing segment 43 to the operating mechanism 2. In greater detail, the wing segment 43 has a pivot portion 431 connected to the linking segment 44, and a slot-defining portion 432 connected to the pivot portion 431, and defining a slide slot 433 that is straight and that has opposite first and second slot end portions 434, 435 being respectively proximate to and distal from, a front end of the brewing apparatus. The pivot segment 23 of the handle 21 and the linking segment 44 of the pivot member 41 of each of the pivot units 4 are formed as one piece, so that the pivot members 41 are formed as a unitary integrally formed structure and are co-movable with the handle 21.

The slide pin 42 of each of the pivot units 4 has an outer end engaging and being slidable along the slide slot 433 of a respective one of the pivot members 41, and an opposite inner end connected to a respective one of the drive mechanisms 5. In this embodiment, the slide pins 42 are connected together to form as one piece. Alternatively, the slide pins 42 may be separate individual components.

Each of the drive mechanisms 5 engages slidably the slide slot 433 of a respective one of the pivot units 4. Each of the drive mechanisms 5 has a seat-connecting portion 511 formed at an end thereof and connected to the capsule seat 7 via a first pivot pin 33 (see FIG. 1), a pivot portion 522 formed at an opposite end thereof and connected to the joint shaft 32, and a pin-connecting portion 521 disposed between the seat-connecting portion 511 and the pivot portion 522, connected to the opposite inner end of a respective one of the slide pins 42, and being pivotable about the joint shaft 32. More specifically, each of the drive mechanisms 5 includes a first arm 51 and a second arm 52. The first arm 51 is curved downward, and has the seat-connecting portion 511 and a coupling portion 512 that is opposite to the seat-connecting portion 511 and that is connected pivotally to the pin-connecting portion 521 via a second pivot pin 34. The second arm 52 has the pin-connecting portion 521 and the pivot portion 522. In this embodiment, the second arms 52 are connected together. Alternatively, the second arms 52 may be separate individual components.

The capsule seat 7 is adapted to receive the capsule therein. The capsule may contain, but not limited to, ground coffee, tea leaves, or tea powders, etc. The capsule seat 7 is driven by the drive mechanisms 5 to move relative to the stationary seat 6 between an engaged position, where the capsule seat 7 engages the stationary seat 6 for brewing operation, and a disengaged position, where the capsule seat 7 is disengaged and spaced apart from the stationary seat 6 in a front-rear direction perpendicular to the left-right direction, so that the capsule can be removed from or inserted into the capsule seat 7.

Figure 4:
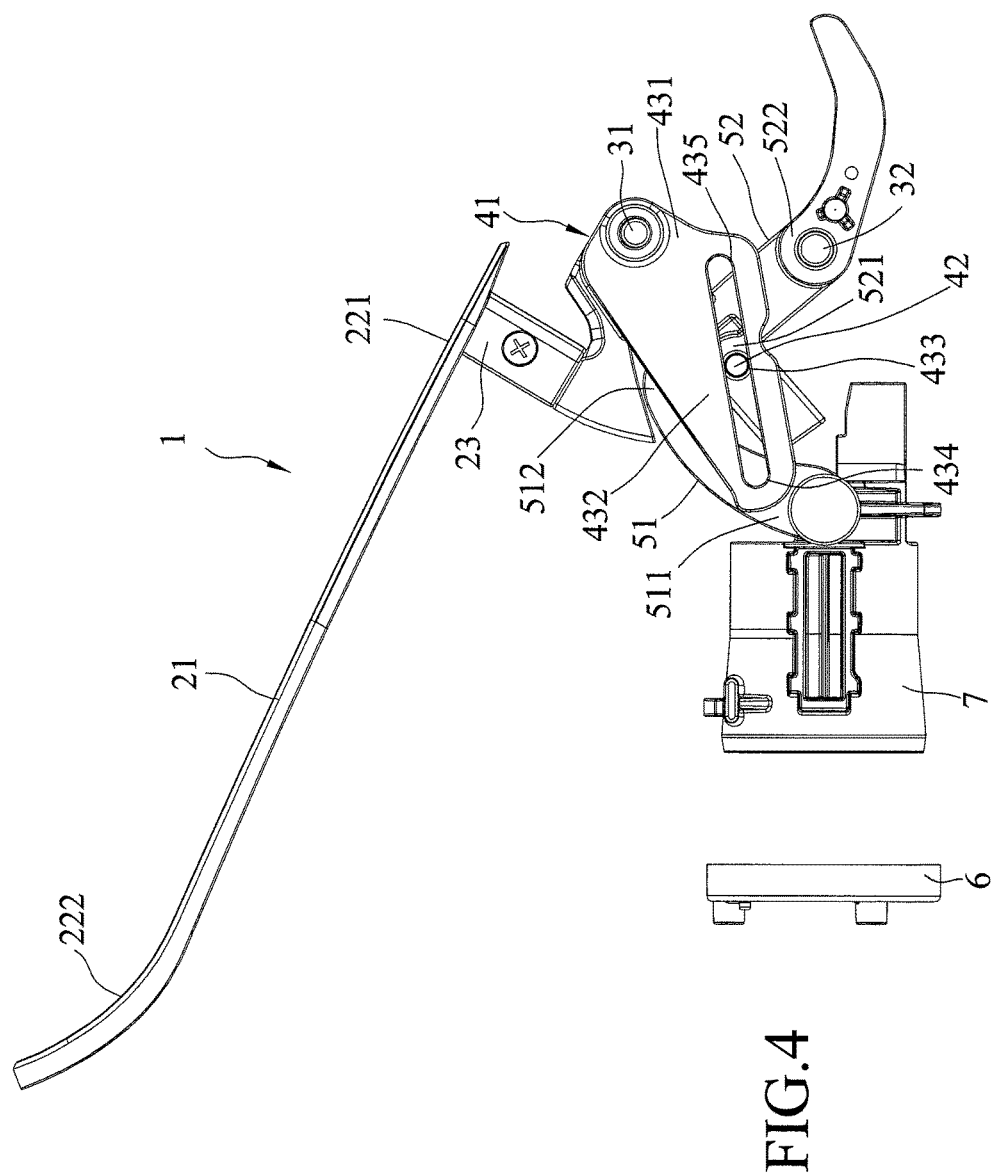
FIG. 4 is a side view illustrating the embodiment being trans formed from the brewing state toward a standby state.
Figure 5:
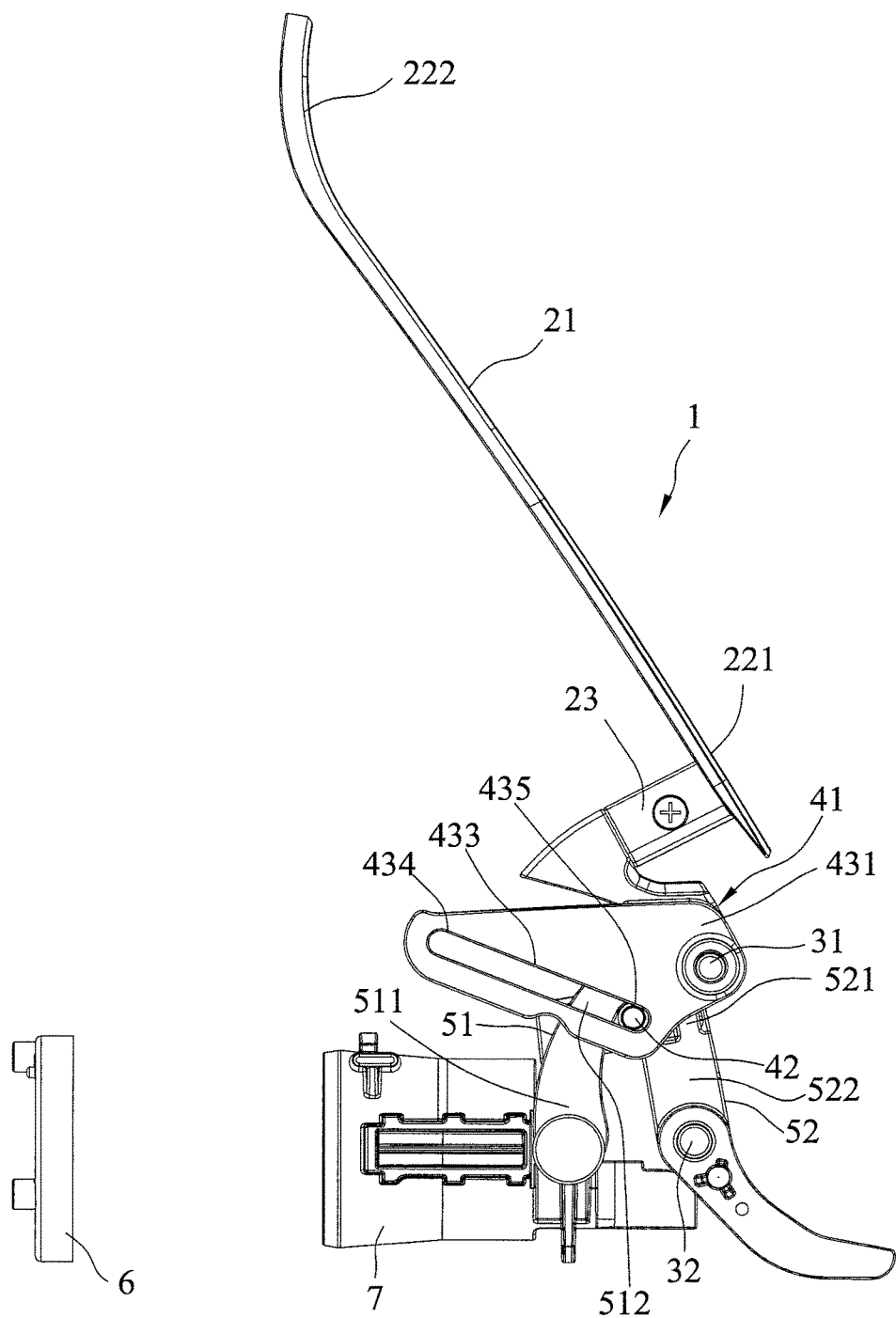
FIG. 5 is a side view illustrating the embodiment in the standby state.

Referring to FIGS. 3 to 5, the control device 1 is operable to drive slide movement of the drive mechanisms 5, thereby moving the capsule seat 7 and converting the brewing apparatus between a brewing state (see FIG. 3) and a standby state (see FIG. 5). When the brewing apparatus is in the brewing state, the handle 21 extends substantially horizontally in the front-rear direction, and for each pivot unit 4, the first slot end portion 434 of the slide slot 433 is below the second slot end portion 435 such that the slide slot 433 extend obliquely upward toward a rear end of the brewing apparatus, and the slide pin 42 is at the first slot end portion 434. At this time, each of the first and second arms 51, 52 of the drive mechanisms 5 extend substantially horizontally in the front-rear direction and the capsule seat 7 is at the engaged position.

To convert the brewing apparatus from the brewing state to the standby state, the handle 21 is pivoted upwardly away from the capsule seat 7, and such action drives pivot movement of the pivot members 41 about the pivot shaft 31 to move each of the slide pins 42 from the first slot portion 434 toward the second slot portion 435 of the sliding slot 433 of a respective one of the pivot units 4. This movement of the slide pins 42 drives the coupling portions 512 of the first arms 51 and the pin-connecting portions 521 of the second arms 52 to move upwardly to bring the first and second arms 51, 52 closer to each other, thereby driving the slide movement of the drive mechanisms 5 to move the capsule seat 7 toward the rear end of the brewing apparatus so that the capsule seat 7 is disengaged from the stationary seat 6. For each pivot unit 4, when the slide pin 42 arrives at the second slot end portion 435, the first slot end portion 434 is above the second slot end portion 435 such that the slide slot 433 extend obliquely downward toward the rear end of the brewing apparatus, as shown in FIG. 5. At this time, the brewing apparatus is in the standby state where the capsule seat 7 is at the disengaged position, so that the capsule can be replaced with a new one for a next brewing process.

In summary, by virtue of the configuration of the slide slots 433 and the movement of the slide pins 42 along the respective slide slots 433 to move the capsule seat 7 toward or away from the stationary seat 6 through the drive mechanisms 5, the brewing apparatus has a relatively simple structure with relatively few component parts.

It should be noted that in this embodiment, the brewing apparatus includes two of the pivot units 4 and two of the drive mechanisms 5 to provide balance and enhance stability during operation. In a variation of the embodiment, the brewing apparatus may only include one pivot unit 4 and one drive mechanism 5, with the pivot member 41 connected to a middle part of the pivot segment 23 of the handle 21 and with the first arm 51 of the drive mechanism 5 pivoted to a center of a rear end of the capsule seat 7.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A brewing apparatus adapted for brewing articles contained in a capsule, said brewing apparatus comprising:
    a capsule seat adapted to receive the capsule therein;
    a control device that has a slide pin, and a pivot member being formed with a slide slot, said control device including an operating mechanism that is fixedly connected to said pivot member for driving said pivot member to move;
    a stationary joint shaft; and
    at least one drive mechanism engages slidably the slide slot and connected to said capsule seat;
    wherein said control device is pivotable to drive slide movement of said at least one drive mechanism, thereby moving said capsule seat and converting said brewing apparatus between a brewing state and a standby state,
    wherein said at least one drive mechanism includes a first arm and a second arm, said first aim having an end that is pivotally connected to the capsule seat and an opposite end that is pivotally connected to said second arm, said second arm having an end that is pivotally connected to said opposite end of said first arm and an opposite end that is pivotable about said joint shaft, said slide pin having one end that engages and is slidable along said slide slot and an opposite end that is connected to said end of said second arm,
    wherein said control device further includes at least one pivot unit including said pivot member and said slide pin,
    wherein said pivot member has a pivot portion co-movable with said operating mechanism, and a slot-defining portion connected to said pivot portion and defining said slide slot,
    wherein said operating mechanism is operable to drive pivot movement of said at least one pivot unit, thereby driving said slide movement of said at least one drive mechanism, and
    wherein said at least one drive mechanism has a seat-connecting portion formed at said end of said first arm and connected to said capsule seat, a pivot portion formed at said opposite end of said second arm and connected to said joint shaft, and a pin-connecting portion disposed between said seat-connecting portion and said pivot portion, formed at said end of said second arm, connected to said opposite end of said slide pin, and being pivotable about said joint shaft.

2. The brewing apparatus as claimed in claim 1, wherein said slide slot is straight.

3. The brewing apparatus as claimed in claim 1, wherein said first arm has said seat-connecting portion and a coupling portion that is formed at said opposite end of said first arm opposite to said seat-connecting portion and that is connected pivotally to said pin-connecting portion.

4. The brewing apparatus as claimed in claim 1, wherein:
said slide slot has opposite first and second slot end portions being respectively proximate to and distal from a front end of said brewing apparatus;
when said brewing apparatus is in the brewing state, said first slot end portion is below said second slot end portion, and said slide pin is at said first slot end portion; and
when said brewing apparatus is in the standby state, said first slot end portion is above said second slot end portion, and said slide pin is at said second slot end portion.

5. The brewing apparatus as claimed in claim 1, wherein said brewing apparatus includes two of said drive mechanisms and two of said pivot units, said pivot member of each of said pivot units being connected to said operating mechanism, said opposite end of said slide pin of each of said pivot units being connected to a respective one of said drive mechanisms.

6. The brewing apparatus as claimed in claim 5, wherein:
said pivot member of each of said pivot units has a wing segment pivotable about said pivot shaft and having said pivot portion and said slot-defining portion, and a linking segment extending from said wing segment to said operating mechanism.

7. The brewing apparatus as claimed in claim 6, wherein said operating mechanism and said linking segment of said pivot member of each of said pivot units are formed as one piece.

* * * * *